United States Patent [19]
Lucas

[11] 3,791,565
[45] Feb. 12, 1974

[54] FILM-TRANSPORTING DEVICE

[75] Inventor: Jan Hendrik Lucas, Zoetermeer, Netherlands

[73] Assignee: Nederlandse Organisatie Voor Toegepast Natuurwetenschappelijk Onderzock Ten Behoeve Van Nijverheid, Handel(En Verkeer), The Hague, Netherlands

[22] Filed: Dec. 20, 1972

[21] Appl. No.: 316,734

[30] Foreign Application Priority Data
Dec. 29, 1971 Netherlands............................ 18032

[52] U.S. Cl.................................. 226/67, 352/196
[51] Int. Cl. ............................................. G03b 1/22
[58] Field of Search....... 226/37, 62, 66, 67, 64, 65, 226/70; 352/174, 137, 194, 195, 196

[56] References Cited
UNITED STATES PATENTS
3,432,228    3/1969    Hellmund...................... 352/137 X
2,095,848    10/1937    Wittel.............................. 226/10 B Primary Examiner—Richard A. Schacher
Assistant Examiner—Gene A. Church
Attorney, Agent, or Firm—Hammond & Littell

[57] ABSTRACT

The invention relates to a film-transporting device for a film projector equipped with a main shaft that rotates with a constant number of revolutions per second, carries a disc shutter and a cam disc that operates on a pull-down claw for transporting the film that is swivable around two axes, wherein an interlocking mechanism controlled by an electromagnet is mounted that for an adjustable period of time can keep the pull-down claw out of reach of the film, and wherein between the main shaft and sprockets a single-revolution clutch is mounted controlled by the electromagnet.

4 Claims, 1 Drawing Figure

PATENTED FEB 12 1974 3,791,565
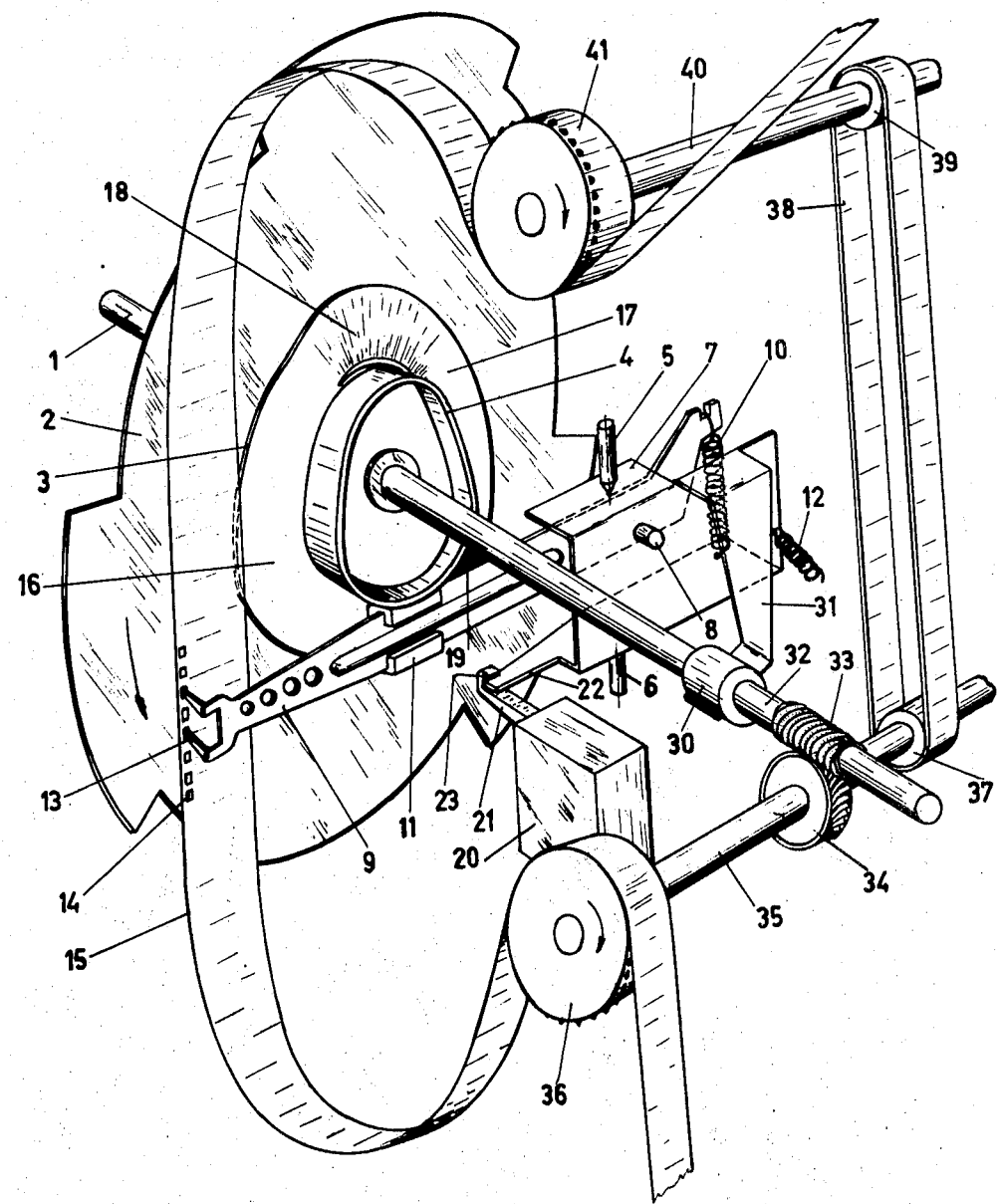

FILM-TRANSPORTING DEVICE

The invention relates to a film-transporting device in particular for transporting a film through a beam of light in order to obtain a projection of the film frames on a screen, a change in the frame rate being enabled in a simple way, for instance from 24 frames per second to 3 frames per second or to a single-frame projection.

This can be attained, e.g., by slowing down the main shaft of the transporting device until the number of frames desired is obtained. As a result of this slowing down not only the time in which the film frame is moved is extended according to the change ratio chosen but also the way of exposure of the frame is changed. This results in a very flickering view of the projections with, moreover, big differences in clarity. This is especially considered to be a great handicap in analysing the movement of filmed objects or persons.

It is the object of the invention to provide a transporting device in which the movement of the frame again and again takes place in the same time but in which the time that a film picture is projected can be extended by a multiple of the projection time at the frame rate of 24 frames per second, while retaining a constant light output and a clarity that remains constant while the control can also be adjusted at a distance of the projector, if desired.

Therefore, according to the invention the transporting device is equipped with a main shaft that rotates with a constant number of revolutions per second, carries a disc shutter and a cam disc that operates on a pull-down claw for transporting the film that is swivable around two axes, an interlocking mechanism controlled by an electromagnet being mounted that for an adjustable period of time can keep the pull-down claw out of reach of the film that is to be transported. Preferably, according to the invention the device is equipped with a single revolution clutch controlled by the electromagnet and mounted between the main shaft and sprockets that serve for a regular transport of the film, which clutch stops the sprockets for the period of time that the interlocking mechanism keeps the pull-down claw out of contact with the film, so that during one or more revolution of the main shaft the film is not being transported at all.

The invention is further elucidated below with reference to a drawing of an embodiment of a transporting device according to the invention that is drawn in perspective, omitting irrelevant bearings and supports.

According to the drawing a horizontal main shaft 1, which is parallel to the optical axis of the projector and in the direction of the arrow is driven by an electromotor, rotating with a constant number of revolutions, is provided with a three-blade disc shutter 2 and a cam disc 3 with a cam 4. In fixed journals 5 and 6 a U-shaped profile 7 has its bearings that owing to this can swivel around a vertical central axis. In this profile 7 a pull-down claw is suspended swivably around a horizontal shaft 8. By its back end pull-down claw 9 is pulled down in profile 7 by a spring 10 and as a result of this pushes with a plastics block 11 against cam 4 of cam disc 3. An other spring 12 acts on profile 7 and pushes plastics block 11 against cam disc 3 itself. At the front end of pull-down claw 9 two teeth 13 are bent that can mesh with perforation 14 of a film 15.

When main shaft 1 is being rotated cam 4 can see to it that film 15 is transported because the former is unround and at each revolution of main shaft 1 pulls down pull-down claw 9 once, the cam being forced to let pull-down claw 9 come up as a result of the tension in spring 10 when the cam is in its lower part. Transporting only takes place, however, when teeth 13 of pull-down claw 9 mesh with perforation 14 and this meshing is controlled by cam disc 3. The latter is not plane but consists of a part 16, which lies near pull-down claw 9 and of a farther part 17, which blend with each other via transitions 18 and 19. Transitions 18 and 19 are situated opposite cylindrical parts of cam 4 with large and small diameter, respectively, because gripping and releasing film 15 must take place in the vertical end positions of pull-down claw 9. As a result of the tension of spring 12 profile 7 and pull-down claw 9 along with it is swiveled around the vertical central axis through journals 5 and 6, during which process plastics block 11 can be pressed against the surface of cam disc 3. As long as block 11 rests on nearer part 16 of disc 3 teeth 13 cannot engage with perforation 14. When pull-down claw 9 comes in its highest position part 16 blends with farther part 17 via transition 18. Teeth 13 then mesh with perforation 14 and under influence of cam 4 take along film 15 downward. In the lowest position of pull-down claw 9, which is drawn, teeth 13 are released from perforation 14 because plastics block 11 follows inclined transition 19 and film 15 then stops. Consequently at each revolution of main shaft 1 film 15 can be moved one frame further and this is effected in less than one-fourth of a revolution. In the process, the blades of disc shutter 2 are placed such that during transporting film 15 there is no projection on the screen.

In this transporting device there is a perfect agreement between the number of revolutions main shaft 1 makes and the number of frames that is projected so that, for instance, at 24 revolutions 24 different pictures are projected per second.

In order to enable a change of the number of frames being projected per second into a lower number an electromagnet 20 is mounted, which is equipped with an interlocking mechanism 21, which can catch around an extension 22 of profile 7. When electromagnet 20 is excited interlocking mechanism 21 is released from extension 22 at a certain moment when pull-down claw 9 is not engaged with film 15. Then pull-down claw 9 can follow the path pre-determined by cam 4 and cam disc 3 and the film is transported normally.

If magnet 20 is not excited, however, interlocking mechanism 21 remains caught around extension 22 and the greater part of the swiveling movement of profile 7 and pull-down claw 9 around the vertical central axis through journals 5 and 6 is prevented. Admittedly, pull-down claw 9 makes its vertical movement through cam 4 but can only follow partially the horizontal movement resulting from cam disc 3, viz. only over nearer part 16 and a part of transitions 18 and 19. Then plastics block 11 is released from cam disc 3 over the rest of transitions 18 and 19 and over farther part 17 and the movement of teeth 13 to perforation 14 of film 15 is blocked. As long as electromagnet 20 is not excited film 15 is not transported and consequently the frame is motionless. Main shaft 1, however, still rotates with the same number of revolutions and disc shutter 2 interrupts the projection also in the same way so that the picture quality and the clarity are not subject to any change no matter how long the picture is on the screen.

Electromagnet 20 can be controlled by a simple electronic circuit if necessary even by a signalling system derived from main shaft 1 and which sees to it that every desired number of frames per second can be obtained that is lower than the number of, for instance, 24 frames per second, indicated by the constant number of revolutions of the main shaft.

Interlocking mechanism 21 is provided with a barb 23 so as to prevent that the interlocking mechanism can be released from extension 22 at any moment of the revolution of main shaft 1. Only when plastics block 11 bears on nearer part 16 of cam disc 3 and teeth 13 of pull-down claw 9 are not engaged with film 15 extension 22 is brought so close against magnet 20 that barb 23 is released. So the release always takes place in approximately the same position of main shaft 1 irrespective of the moment when during the revolution of the main shaft electromagnet 20 is excited. It is self-explanatory, however, that the adjustment of the electronic equipment for control of the electromagnet is adapted as much as possible to the exact point of time. The control of this equipment can be mounted on to the projector itself but can also be adjusted at distance via a line so that the adjustment is, for instance, attended to from near the projection screen. As a result of fitting this barb 23 engaging of interlocking mechanism 21, too, can only take place again during the same period of cam disc 3.

Film 15 is normally unwound from a reel and after having passed the optical system of the projector is wound on to an other reel. In doing so, it is customary that the winding reel is driven from the main shaft. Between the reels and the location where the film frame must be motionless so that it can be projected there are generally sprockets that can also be driven by the main shaft and film loops are kept up between these reels and the pull-down claw in order to obtain uniformity in the rocking transport by the pull-down claw, which moves quickly up and down. By mounting the sprockets that regularly transport one frame per revolution of the main shaft the rocking movement is limited only to a small part of the film. In the event of 24 frames per second one frame is moved in 1/24 second by the sprockets whereas the pull-down claw moves a frame in approximately one hundredth second. When, however, variations are effected in the change of frame difficulties arise upon evenly transporting the film by the sprockets and the film loops before and after the pull-down claw will get irregular shapes that, if necessary, can be scanned by a loop corrector.

In the transporting device according to the invention as drawn, on to main shaft 1 a single revolution clutch 30 is mounted, which is operated by a lever 31, which is attached to profile 7. When electromagnet 20 is not excited and film 15 is not transported by pull-down claw 9 lever 31 catches behind a cam of single-revolution clutch 30 and the latter then stops and is not rotated. To single-revolution clutch 30 on an extension 32 of main shaft 1 a worm gear 33 is connected, which as desired rotates along with main shaft 1 or is motionless. Worm gear 33 meshes permanently with a worm wheel 34 on a horizontal shaft 35 on which is situated a sprocket 36, whose teeth mesh with perforation 14 of film 15. On the same shaft 35 another transmission wheel 37 is provided, which via a toothed belt 38, which does not slip drives a transmission wheel 39 on an upper shaft 40. On this upper shaft 40 a second sprocket 41 is situated, whose teeth also mesh with perforation 14 of film 15.

When pull-down claw does not transport film because electromagnet 20 is not excited extension 32 of main shaft 1 is motionless, too, and nowhere film is being transported. As soon as electromagnet 20 is excited interlocking mechanism 21 can drop, profile 7 swivels out freely and lever 31 moves such that single revolution clutch 30 is released. Then worm gear 33 rotates along with main shaft 1 for one revolution and as a result sprockets 36 and 41 transport one frame of film 15 whereas in the meantime pull-down claw 9 transports a frame in approximately a quarter of the revolution time of the main shaft. Consequently towards the reels a considerable uniformity in the movement of the film is obtained. The actual film transport is controlled by electromagnet 20 and interlocking mechanism 21.

In the embodiment drawn a mechanical single-revolution clutch 30 is shown and a lever 31 attached to profile 7. A similar lever can also be connected direct, however, to interlocking mechanism 21. As soon as electromagnet 20 is excited then the single-revolution clutch meshes immediately so that sprockets 36 and 41 are taken along.

A further simplification of the mechanical side can also be found by constructing single-revolution clutch 30 as an electromagnetic clutch. Consequently as soon as electromagnet 20 is excited the electromagnetic single-revolution clutch can be switched on and the sprockets be moved over one frame. Furthermore, in the circuit of the electromagnetic clutch a loop corrector can be mounted that reacts when the film loop ahead of pull-down claw 9 becomes smaller. Replacing mechanical single-revolution clutch 30 by an electromagnetic clutch may offer the advantage that upon rewinding the film also variations in the number of frames per second may be applied. For when using the mechanical single-revolution clutch this is far less possible, unless this clutch is also constructed for two directions.

When the film is stored in a cassette the shafts of the reels instead of the sprockets can also be considered as elements (driven via the clutch on the main shaft) that can be stopped during the period that the film is not being transported by the pull-down claw. Upon rotation of the reels then a compensation for differences in diameter of the wound-up film ought to be built in, for example, in the form of slip clutches.

I claim

1. A film-transporting device for use in a film projector comprising
   a. a motor driven main shaft rotating with a constant number of revolutions and carrying a disc-shutter, a cam-disc and a clutch;
   b. a claw-means pivotably suspended in said device and provided with a claw, bearing teeth adapted to mesh with perforations of the film, said claw cooperating continuously with the cam of said cam-disc for movement of said teeth in planes parallel to the film, said claw cooperating intermittently with the disc of said cam-disc for movement of the teeth in planes normal to the film;
   c. an interlocking mechanism controlled by an electromagnet, said mechanism intermittently cooperating with an extension of said claw-means for preventing cooperation between said claw and the disc of said cam-disc and preventing movement of the teeth in planes normal to the film;
d. a coaxial extension of the main shaft connected to at least one sprocket for regular transport of the film, which coaxial extension is intermittently coupled to said main shaft by said clutch; and
e. means to connect said interlocking mechanism with said clutch.

2. The film-transporting device of claim 1, wherein said claw-means comprises a claw and a carrier having a U-profile, said claw being provided pivotably around a horizontal axis in said carrier, which carrier is swivable around a vertical axis in said device and said extension of said claw-means is provided on said carrier.

3. The film-transporting device of claim 1, wherein said means to connect said interlocking mechanism with said clutch is a lever provided on the claw-means, which lever cooperates intermittently with said clutch and upon cooperation with said clutch disconnects the main shaft and its coaxial extension.

4. The film-transporting device of claim 1, wherein said means to connect said interlocking mechanism with said clutch is a lever provided on the interlocking mechanism which lever cooperates intermittently with said clutch and upon cooperation with said clutch disconnects the main shaft and its coaxial extension.

* * * * *